United States Patent
Paul et al.

(10) Patent No.: US 8,621,532 B2
(45) Date of Patent: *Dec. 31, 2013

(54) METHOD OF TRANSMITTING LAYERED VIDEO-CODED INFORMATION

(75) Inventors: Baldine-Brunel Paul, Madison, NJ (US); Glenn L. Cash, Matawan, NJ (US); M. Reha Civanlar, Middletown, NJ (US); Barin Geoffry Haskell, Tinton Falls, NJ (US); Paul G. Howard, Morganville, NJ (US); Atul Puri, Riverdale, NY (US); Robert Lewis Schmidt, Howell, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1104 days.

This patent is subject to a terminal disclaimer.

(21) Appl. No.: 11/419,844

(22) Filed: May 23, 2006

(65) Prior Publication Data

US 2006/0200848 A1 Sep. 7, 2006

Related U.S. Application Data

(63) Continuation of application No. 09/882,036, filed on Jun. 18, 2001, now abandoned.

(51) Int. Cl.
*H04N 7/173* (2011.01)
*H04N 7/12* (2006.01)
*H04N 11/02* (2006.01)
*H04N 11/04* (2006.01)

(52) U.S. Cl.
USPC .......... 725/95; 725/90; 725/93; 725/94; 375/240.12; 375/240.13; 375/240.14; 375/240.15; 375/240.25; 375/240.26

(58) Field of Classification Search
None
See application file for complete search history.

(56) References Cited

U.S. PATENT DOCUMENTS 5,111,292 A 5/1992 Kuriacose et al.
5,122,875 A 6/1992 Raychaudhuri et al.
(Continued)

FOREIGN PATENT DOCUMENTS

EP 0 952 709 10/1999
EP 1 058 459 12/2000
WO WO 00/02392 1/2000

OTHER PUBLICATIONS

Cohen R et al., "Streaming Fine-Grained Scalable Video Over Packet-Based Networks", Globecom'00. 2000 IEEE Global Telecomunications Conference. San Francisco, CA, Nov. 27-Dec. 1, 2000; [IEEE Global Telecomunications Conference], New York, NY; IEEE US, vol. 1, Nov. 27, 2000, pp. 288-292, XP001195579 ISBN:978-0-7803-6452-3.*

(Continued)

*Primary Examiner* — Jason J Chung
*Assistant Examiner* — Omar S Parra

(57) ABSTRACT

Video-coded information is transmitted over a network at a priority level that is determined based on feedback from the network. In an embodiment, the feedback comprises a response to a request for information on whether the network currently has the available capacity to transmit additional high priority traffic. In an embodiment, a candidate base layer frame is transmitted over a network as a base layer frame if permission to send high priority data was granted and is transmitted over the network as an enhancement layer frame if permission to send high priority data was denied. In a further embodiment, the candidate base layer frame is deleted if permission to send high priority data was denied.

19 Claims, 7 Drawing Sheets

(56) References Cited

U.S. PATENT DOCUMENTS

| | | | |
|---|---|---|---|
| 5,231,486 A | 7/1993 | Acampora et al. | |
| 5,515,377 A * | 5/1996 | Horne et al. | 370/395.64 |
| 5,576,902 A | 11/1996 | Lane et al. | |
| 5,764,235 A | 6/1998 | Hunt et al. | |
| 5,990,945 A | 11/1999 | Sinha et al. | 348/219 |
| 5,995,148 A | 11/1999 | Haskell et al. | |
| 6,057,884 A | 5/2000 | Chen et al. | |
| 6,104,757 A | 8/2000 | Rhee | |
| 6,148,005 A | 11/2000 | Paul et al. | |
| 6,233,283 B1 * | 5/2001 | Chiu et al. | 375/240.27 |
| 6,263,022 B1 | 7/2001 | Chen et al. | |
| 6,275,531 B1 * | 8/2001 | Li | 375/240.12 |
| 6,292,512 B1 * | 9/2001 | Radha et al. | 375/240.1 |
| 6,356,309 B1 * | 3/2002 | Masaki et al. | 348/439.1 |
| 6,470,378 B1 | 10/2002 | Tracton et al. | |
| 6,490,705 B1 | 12/2002 | Boyce | |
| 6,496,217 B1 | 12/2002 | Piotrowski | |
| 6,496,980 B1 | 12/2002 | Tillman et al. | |
| 6,499,060 B1 | 12/2002 | Wang et al. | |
| 6,501,797 B1 | 12/2002 | Van der Schaar et al. | |
| 6,584,509 B2 | 6/2003 | Putzolu | |
| 6,587,985 B1 | 7/2003 | Fukushima et al. | |
| 6,600,835 B1 | 7/2003 | Ishikawa | |
| 6,614,936 B1 | 9/2003 | Wu et al. | |
| 6,788,553 B1 | 9/2004 | Jin et al. | |
| 6,792,470 B2 | 9/2004 | Hakenberg et al. | |
| 6,798,838 B1 | 9/2004 | Ngo | |
| 6,816,194 B2 * | 11/2004 | Zhang et al. | 375/240.27 |
| 6,894,973 B1 * | 5/2005 | Mishra | 370/229 |
| 7,095,782 B1 | 8/2006 | Cohen et al. | |
| 2004/0261113 A1 * | 12/2004 | Paul et al. | 725/90 |

OTHER PUBLICATIONS

Cohen R et al., "Streaming Fine-Grained Scalable Video Over Packet-Based Networks", Globecom '00. 2000 IEEE Global Telecommunications Conference. San Francisco, CA, Nov. 27-Dec. 1, 2000; [IEEE Global Telecommunications Conference], New York, NY; IEEE, US, vol. 1, Nov. 27, 2000, pp. 288-292, XP001195579 ISBN:978-0-7803-6452-3.

Guerri J C et al., "A feedback packet-level error control for real-time applications in wireless networks", Vehicular Technology Conference, 1999. VTC-Fall IEEE VTS 50$^{th}$ Amsterdam, Netherlands Sep. 19-22, 1999, Piscataway, NJ, USA, IEEE, US vol. 2, Sep. 19, 1999, pp. 879-883, XP010353105 ISBN: 978-0-7803-5435-7.

Almesberger W., et al.: *SRP: a scalable resource reservation protocol for the Internet*; Sep. 15, 1998, Computer Communications, Butterworths & Co. Publishers LTD., pp. 1200-1211.

Gilge, M., et al.: *Motion Video Coding for Packet-Switching Networks—An integrated Approach*, 1991, Visual Communication and Image Processing, 1991: visual communication, Nov. 11-13, 1991, Boston, Bellingham, WA, US, pp. 592-603.

Walker et al, "A Study of the Efficiency of Layered Video Coding Using H.263", BT Laboratories, printed from the internet on Jun. 5, 2001.

* cited by examiner

METHOD OF TRANSMITTING LAYERED VIDEO-CODED INFORMATION

CROSS REFERENCE TO RELATED APPLICATIONS

The present application is a continuation of U.S. patent application Ser. No. 09/882,036, filed on Jun. 18, 2001, which is incorporated by reference.

TECHNICAL FIELD

Embodiments of the present invention relate to transmitting video information over a network. In particular, embodiments of the present invention relate to methods for setting a transmission priority for layered video-coded information that is to be transmitted over a network.

BACKGROUND OF THE INVENTION

One of the most promising applications in the field of communications is the transmission of encoded or compressed video information across mediums such as telephone networks, cable television networks, and the Internet. The video information is typically encoded at one location, transferred over a network to a destination, and decoded at the destination. A video encoder may be used to, among other things, receive video signals and other data, convert these to digitized form (if the data is not already in digitized form), and compress the data using an encoding algorithm. Examples of video encoding algorithms are the MPEG-1, MPEG-2, and MPEG-4 digital video-coding standards of the Motion Picture Expert Group and the H.261 and H.264 standards from the ITU-T (International Telecommunications Union-Telecommunications sector). The video information may be first obtained from a video camera that generates video signals which contain a series of video frames that each depict images. In addition, the video-coded information may also include other components such as, for example, animations, text, and/or audio information. A video decoder may be used at the destination to decode the received video-coded frames into a format that may be displayed by a video monitor or other device.

The networks over which video-coded information is transmitted generally have limited bandwidth. The amount of bandwidth available at any given time depends upon factors such as the amount of traffic and the operability of network components. The amount of available bandwidth is a major parameter for the quality of the video presented by the video decoder, with an increase in bandwidth increasing the quality of the video. The unavailability of bandwidth may cause video-coded frames to be lost or delayed while being sent across the network due to network congestion or buffer overflow. Such losses and delays may cause severe degradation in perceived quality of the video displayed by the video decoder and may result in error propagation, especially where the video is sent in real-time or streamed or where the video contains objects in motion.

One way to combat the impact of limited bandwidth is to use a "layered" video-coding scheme. Layered video-coding schemes divide a stream of video-coded frames into layers. In the standard layered video-coding scheme, the video-coded information signal is divided into a base layer and an enhancement layer. The enhancement layer typically provides refinement information that is added to the base layer to provide higher quality. For example, the base layer may typically be decoded and displayed without any data from the enhancement layer, although this would probably result in reduced picture quality. When network congestion occurs, packets may be dropped from the enhancement layer, but valid video at a slightly lower quality may still be produced by decoding packets from the base layer.

Traffic that is sent over a network is often classified by a priority level. In many networks, the priority level will be used if the network needs to drop some of the packets being transported. For example, if network congestion occurs and the network has to drop packets, the network will typically drop the lower level packets. A video encoder may take advantage of these classifications by designating some video-coded frames as high priority and the rest as low priority. For example, every fifth frame may be sent as high priority, with the rest being sent as low priority. A typical layered video-coding scheme is to transmit enhancement layer traffic over the network with a lower priority than the base layer. Another scheme, which is referred to as using multiple threads, codes the base layer frames independently, using only previous base layer frames for motion compensation, and codes the enhancement layer frames normally, using both base and enhancement layer frames for motion compensation.

A problem may occur when using a layered video-coding scheme if there are simultaneous attempts to transmit high priority base layer frames. If this occurs, the network may become overloaded with high priority data. In this case, either base layer frames may be lost, causing drastic quality reduction, or the network may be forced to buffer some of the base layer frames, causing excessive delays.

SUMMARY OF THE INVENTION

Embodiments of the present invention alleviate degradation in a layered video-coded system by using feedback from the network indicating whether or not capacity is available for sending the high priority frames. The feedback may include a response to a request for information on whether the network currently has the available capacity to transmit additional high priority traffic. In an embodiment, a candidate base layer frame is transmitted over the network as a base layer frame if permission to send high priority data was granted and is transmitted over the network as an enhancement layer frame if permission to send high priority data was denied. In a further embodiment, a candidate base layer frame is deleted if permission to send high priority data was denied.

DETAILED DESCRIPTION OF THE INVENTION

The present invention provides an improved method of transmitting layered video-coded data by using network feedback which indicates whether bandwidth is available to send high priority frames (e.g., base layer frames). In an embodiment, the encoder does not decide a priori which frames are to be transmitted as base layer frames, but rather requests permission from the network to transmit high priority data before encoding a candidate base layer frame. In this embodiment, the candidate base layer frame may either be encoded and transmitted as a base layer frame if permission to send high priority data is granted or may be transmitted as a low priority frame, or deleted from transmission, if permission to send high priority data was denied. This and other embodiments are described in more detail below. By using an embodiment of the present invention, the likelihood of network overload is minimized because the arrival of high priority data into the network is randomized. In addition, embodiments of the invention avoid buffering large amounts of data and thus avoid the delay that such buffering may cause. Use of the present invention may therefore alleviate degradation of perceived picture quality due to loss of frames or buffering delays.

Figure 1:
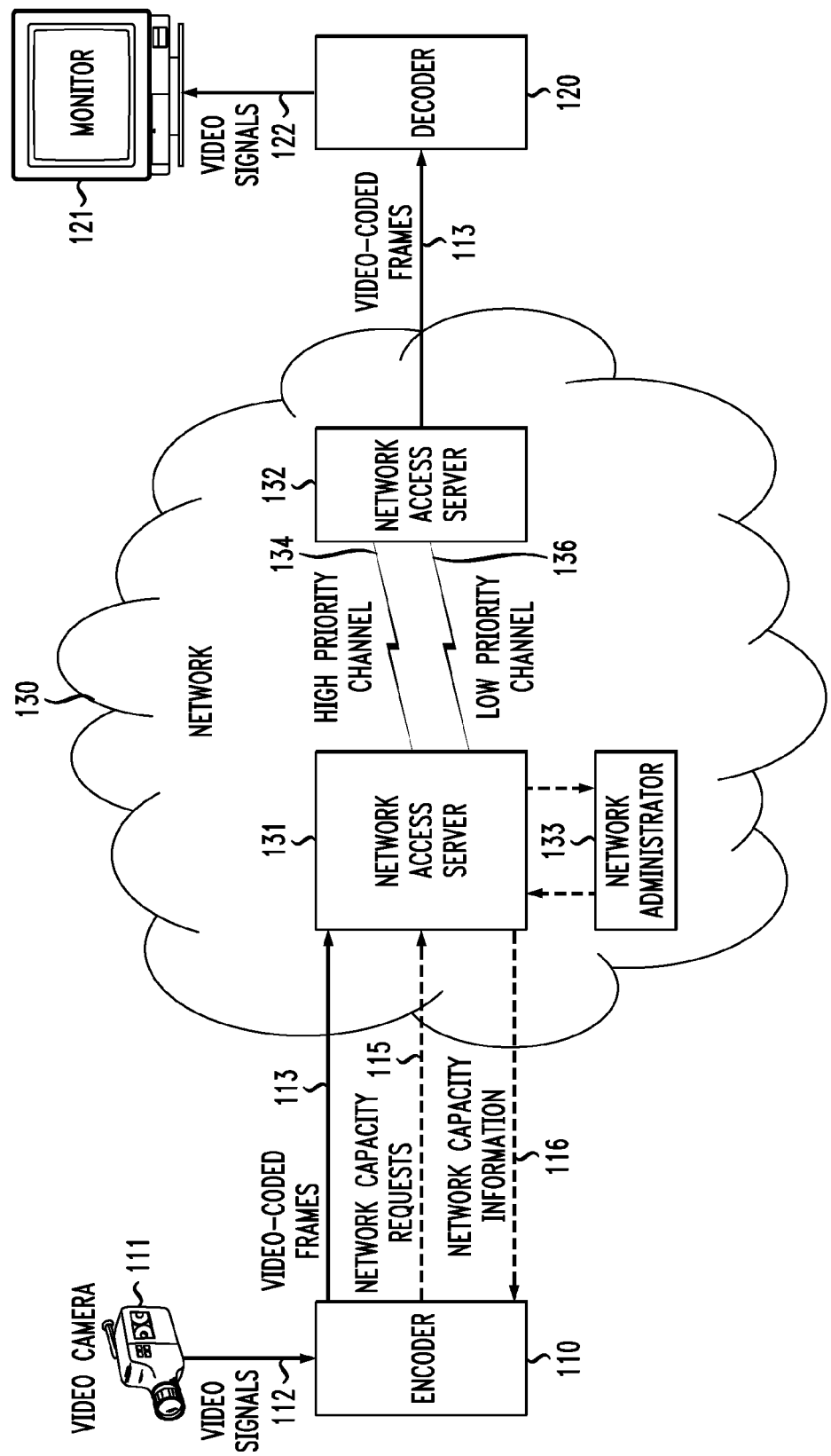
FIG. 1 is a block diagram of a system including a video encoder and decoder according to an embodiment of the present invention.

FIG. 1 is a block diagram of a system including a video encoder and decoder according to an embodiment of the present invention. FIG. 1 shows a video encoder 110 and a video decoder 120 both of which are coupled to a network 130. The term "coupled" is intended to encompass and be broader than the term "directly connected." As discussed below, encoder 110 or another device may transmit video-coded data (such as video-coded frames 113) to decoder 120 across network 130 at a priority level that is determined using information about the network's available capacity (such as network capacity information 116). This information may be provided in response to a request for such information (such as network capacity request 115). Of course, the present invention is not limited to the system shown in FIG. 1. For example, in other embodiments, video-coded data may be sent by an encoder such as encoder 110 to devices other than a decoder. For example, encoder 110 may send video-coded data to a data storage facility for later use by a decoder. As another example, video-coded data may be sent from encoder 111 to a transmission device which transmits the data across the network. Similarly, in other embodiments, stored video-coded data that had been previously encoded may be transmitted to a decoder such as decoder 120 by a device other than an encoder.

Network 130 may be any information systems network across which information can be sent. Examples of network 130 include the Internet, an intranet, a wireline telephone network, a wireless telephone network, a virtual private network, or any combination of these networks. Encoder 110 may be used to encode video data, such as video signals 112, for transmission across a network as video-coded frames. Encoder 110 may output video-coded data that complies with a video-coding standard or algorithm such as MPEG-1, MPEG-2, MPEG-4, H.261, and H.264. In FIG. 1, encoder 110 is shown coupled to a video camera 111. In an embodiment, video camera 111 outputs video signals 112 to encoder 110. In other embodiments, encoder 110 may encode prerecorded video signals or may receive other types of input such as animation, text, or audio data. Decoder 120 may be used to receive and decode video-coded frames for display as video images. Decoder 120 is shown coupled to monitor 121 and may output decoded video data, such as video signals 122, for display as video images on monitor 121.

As shown in FIG. 1, network 130 includes a network access server 131 that connects encoder 110 to network 130 and a network access server 132 that connects decoder 120 to network 130. Network access server 131 and network access server 132 may permit connections to network 130 from outside the network and may be operated by a third-party such as AT&T Corp.® or America Online, Inc.® Network 130 includes a network administrator 133 which administers operation of network 130. In an embodiment, network 130 may be decentralized and may contain multiple network administrators. FIG. 1 shows a high priority channel 134 and a low priority channel 136 coupling network access server 131 to network access server 132. In an embodiment, high priority channel 134 and a low priority channel 136 are logical paths across network 130, and data may be transmitted across each logical path using various physical paths. In an embodiment, network 130 contains a plurality of virtual circuits that may be used to transmit high priority traffic and a plurality of virtual circuits that may be used to transmit low priority traffic. In an embodiment, network 130 contains a plurality of nodes, such as router or switches, and many of these nodes may be used to transmit data for both high priority channel 134 and low priority channel 136.

A person of skill in the art would appreciate that the amount of traffic across network 130 may be dynamic, and thus that the amount of available bandwidth may be constantly changing over time. At any given time, network 130 may experience congestion and may be unable to provide bandwidth for transmitting additional data. When network congestion occurs, network 130 may take appropriate actions such as dropping data or buffering data. For example, if a data packet XYZ is sent from network access server 131 to be forwarded across network 130 to network access server 132, but network 130 does not have the bandwidth to transmit data packet XYZ, then data packet XYZ may be dropped and a message indicating this dropping may be transmitted back to encoder 110. In an embodiment, network 130 will drop low priority packets before dropping a high priority packet. Network 130 may impose an additional charge for the transmission of data on a high priority channel.

In an embodiment, network administrator 133 maintains information about the amount of currently available network bandwidth and may provide information about current network capacity and expected future network capacity as feedback to encoder 110. For example, encoder 110 may send a network capacity request 115 through network access server 131 to network administrator 133, and in response network administrator 133 may send network capacity information 116 through network access server 131 to encoder 110. Network capacity request 115 may be a request for information about the availability of capacity to send a type of data (e.g., a high priority frame or base layer frame), and network capacity information 116 may be a response to such a request. In an embodiment, a request for information sent from encoder 110 does not specify the type of data to be transmitted (e.g., that the data is video-coded frames) and may be, for example, a request for a specified amount of bandwidth. In this example, the priority of the bandwidth, the size of the data, and/or the duration may be specified. In an embodiment, a request is not required for the sending of network capacity information 116, and network capacity information may be sent, for example, on a periodic basis or during conditions determined by network administrator 133. Of course, a person of ordinary skill in the art would appreciate that network capacity request 115 and network capacity information 116 may be transmitted between encoder 110 and network access server 131 using the same connection as the video-coded frames 113. Embodiments of the present invention that make use of this network capacity information when transmitting video-coded information are further described below.

Figure 2:
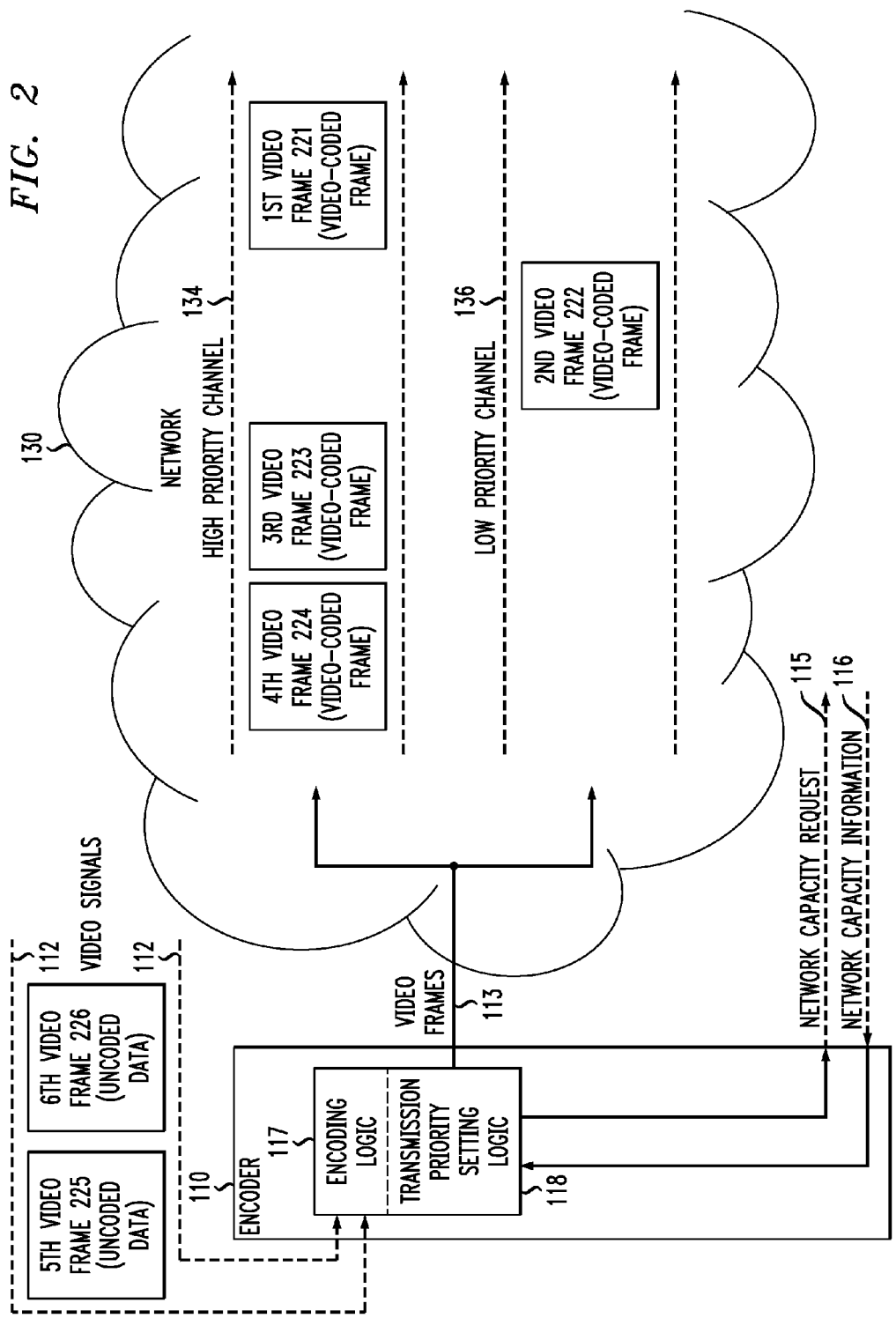
FIG. 2 is a block diagram of a video encoder according to an embodiment of the present invention.

FIG. 2 is a block diagram of a video encoder according to an embodiment of the present invention. FIG. 2 shows an encoder 110 such as in FIG. 1 above. In addition, FIG. 2 shows a stream of video signals 112 that is coded by encoder 110 and transmitted as a stream of video-coded frames 113 across network 130 over two logical channels (high priority channel 134 and low priority channel 136). FIG. 2 shows six video frames that may be part of the same stream of video data. The first four frames in the stream (i.e., $1^{st}$ video frame 221, $2^{nd}$ video frame 222, 3rd video frame 223, and 4th video frame 224) have already been encoded and are being transmitted over network 130, while the other two frames ($5^{th}$ video frame 225 and $6^{th}$ video frame 226) consist of uncoded data that is being transmitted for coding to encoder 110 by, for example, video camera 111 of FIG. 1. Of course, each of the video-coded frames may comprise multiple frames of uncoded video data. As discussed above, the video-coded frames may also include non-video information such as animations, text, control information, and/or audio information. In the embodiment shown, each of the video-coded frames 113 transmitted across network 130 contain a priority level field. A frame that has a low priority level such as $2^{nd}$ video frame 222 is transmitted on low priority channel 136. In an embodiment, the priority level is built into the video-coded frame when it is encoded. In other embodiments, the priority level may be added to a video-coded frame after the frame is encoded or may be transmitted to network 130 as a data element separate from the video-coded frame.

As shown in FIG. 2, encoder 110 contains encoding logic 117 and transmission priority setting logic 118. Encoding logic 117 may be used to encode the video data. Transmission priority setting logic 118 may send network capacity requests 115 and may receive network capacity information 116 in response to these requests. Transmission priority setting logic 118 may use the network capacity information to select a transmission priority for each of the video-coded frames 113 according to an embodiment of the present invention such as the method discussed below. Of course, encoder 110 may contain additional components such as logic to control the transmission of data to network 130. As would be appreciated by a person of ordinary skill in the art, encoder 110 may also contain an analog-to-digital converter, transform logic, quantizer logic, and prediction logic. The components in encoder 110 may be embodied in software, hardware, firmware, or some combination. Encoder 110 may include one or more central processing units (CPUs), random access memories (RAMs), and Read Only Memories (ROMs), and memories in encoder 130 may store instructions to be executed by a processor to carry out embodiments of the invention as described herein. The logic in encoder 110 may be embodied in a special purpose processing unit such an application specific integrated circuit (ASIC). In an embodiment, encoder 110 is a personal computer (PC) that contains software to carry out an embodiment of the present invention.

Figure 3:
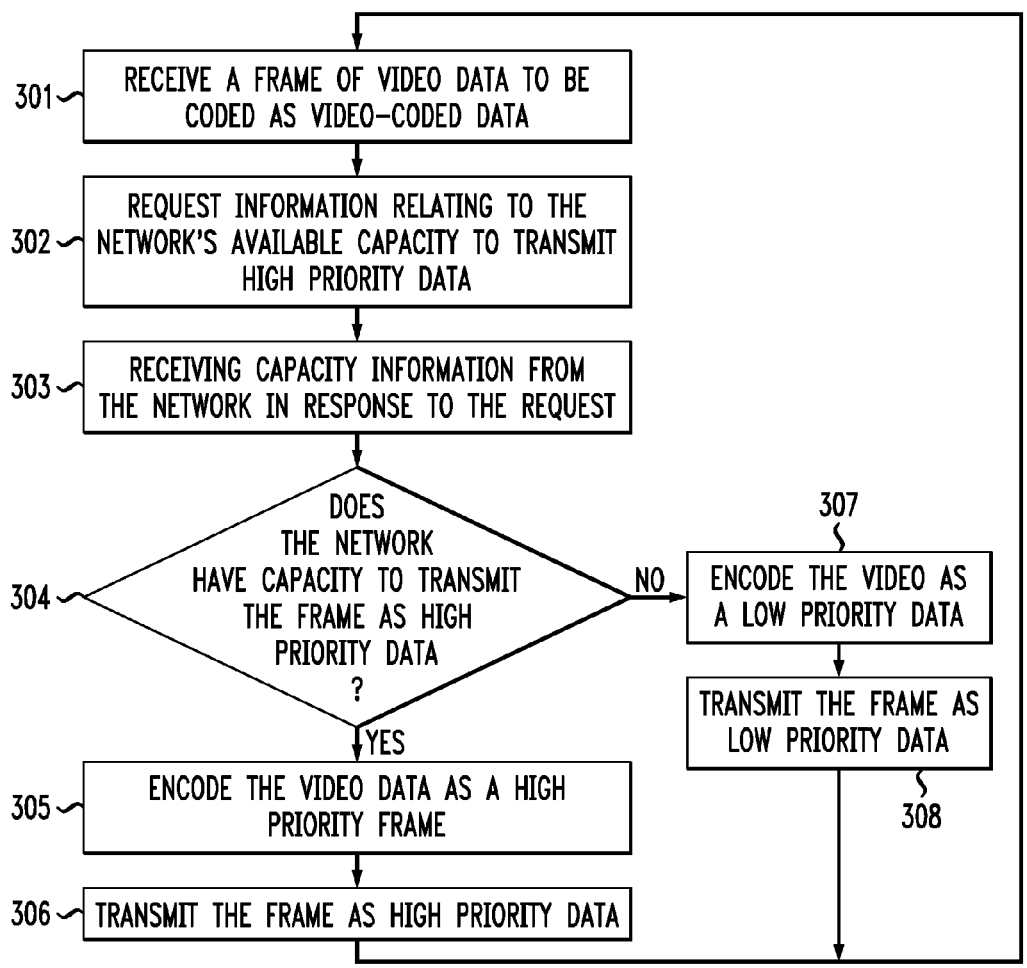
FIGS. 3-7 are flow diagrams of methods of transmitting video information according to embodiments of the present invention.

FIG. 3 is a flow diagram of a method of transmitting video information according to an embodiment of the present invention. The description below is explained with reference to the systems shown in FIGS. 1 and 2, but of course these methods may be used with other systems. As shown in FIG. 3, a frame of video data to be coded as video-coded data is received (301). For example, a frame of video data may be received at encoder 110 from video camera 111 or may be received from a buffer in another part of encoder 110. In embodiments, the frames of video data may already be stored at the encoder (e.g., buffered at the encoder) prior to coding. The encoder may send a request for information relating to the network's available capacity to transmit high priority data (302), and capacity information may be received in response to the request (303). Examples of the request and response are shown in FIG. 1 as network capacity requests 115 and network capacity information 116. In an embodiment, network administrator 133 will determine if the capacity to send high priority data is available and will send a response to encoder 110. If the response indicates that the network has the capacity to transmit the frame as high priority data (304), then the frame is encoded as a high priority frame (e.g., a base layer frame) (305) and is transmitted as high priority data (306). If the response indicates that the network does not have the capacity to transmit high priority data (304), then the frame is encoded as a low priority frame (e.g., an enhancement layer frame) (307) and is transmitted as low priority data (308). Frames that are transmitted as high priority data may use a high priority channel across network 130 and frames that are transmitted as low priority data may use a low priority channel across network 130.

Figure 4:
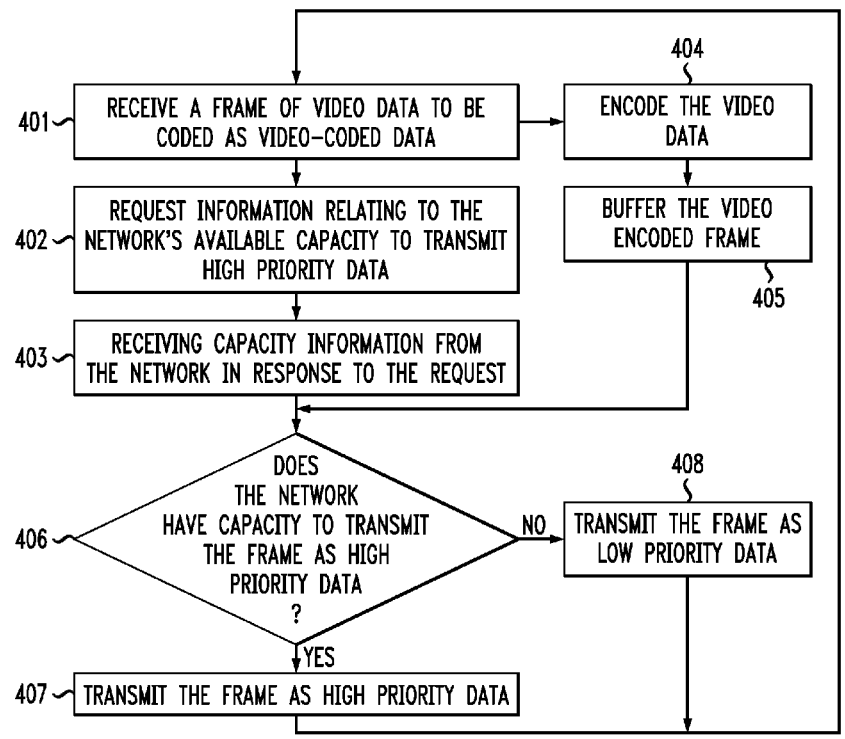

FIG. 4 is a flow diagram of a method of transmitting video information according to another embodiment of the present invention. As in the previous embodiment, the encoder may receive a frame of video data to be coded as video-coded data (401), may send a request for information relating to the network's available capacity to transmit high priority data (402), and may receive capacity information in response to the request (403). In this embodiment, the data is video-coded (404) and the video-encoded frame is buffered (405) at substantially the same time as the request is sent and/or the response to the request is received. If the network has the capacity to transmit the frame as high priority data (406), then the request is transmitted as high priority data (407). If the network does not have the capacity to transmit high priority data (406), then the video frame is transmitted as low priority data (408). In some embodiments, such as very high compression codecs, the frame has to be recoded as a high priority frame. In other embodiments, the frame may have been coded at both priorities (high and low) in parallel, and the frame with the desired priority may be chosen at a later time.

Figure 5:
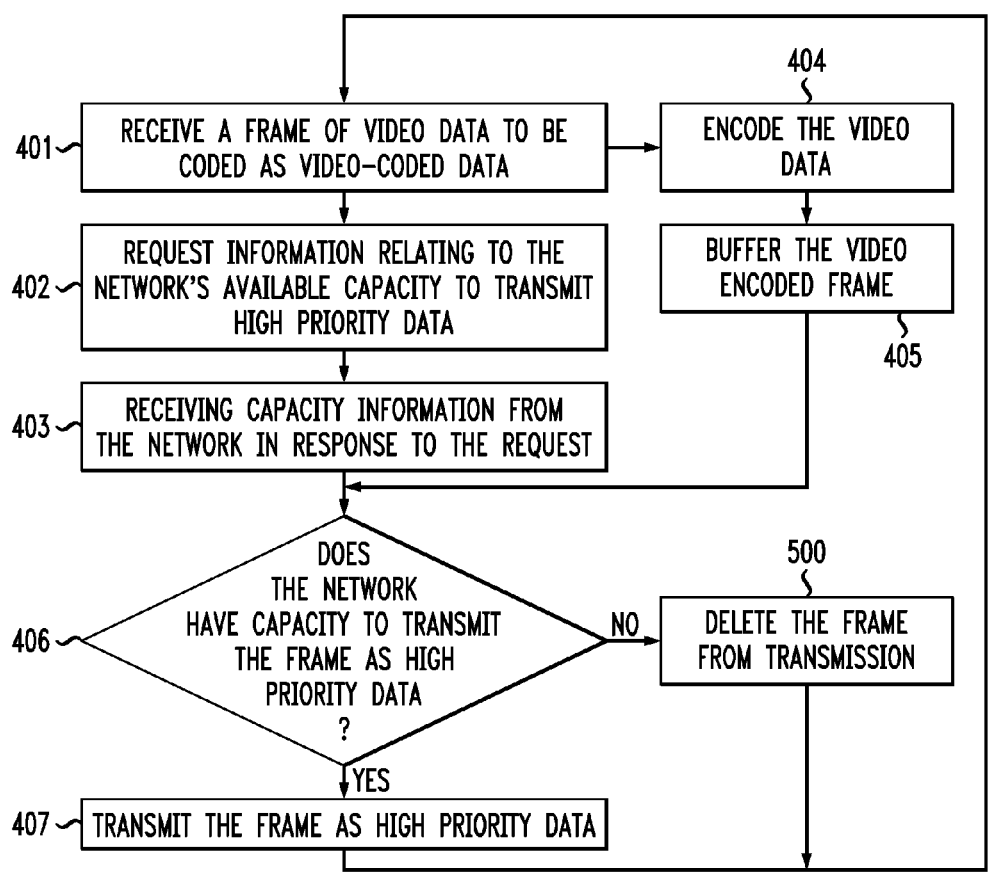

FIG. 5 is a flow diagram of a method of transmitting video information according to another embodiment of the present invention. FIG. 5 contains steps 401 to 407 as in FIG. 4. In this embodiment, however, the encoded frame is deleted from transmission (500) if the network does not have the capacity to transmit high priority data. When an encoded frame is deleted from transmission, the video data may be lost, but such a loss may not greatly impact perceived picture quality as long as the encoder 110 is aware of the loss.

Figure 6:
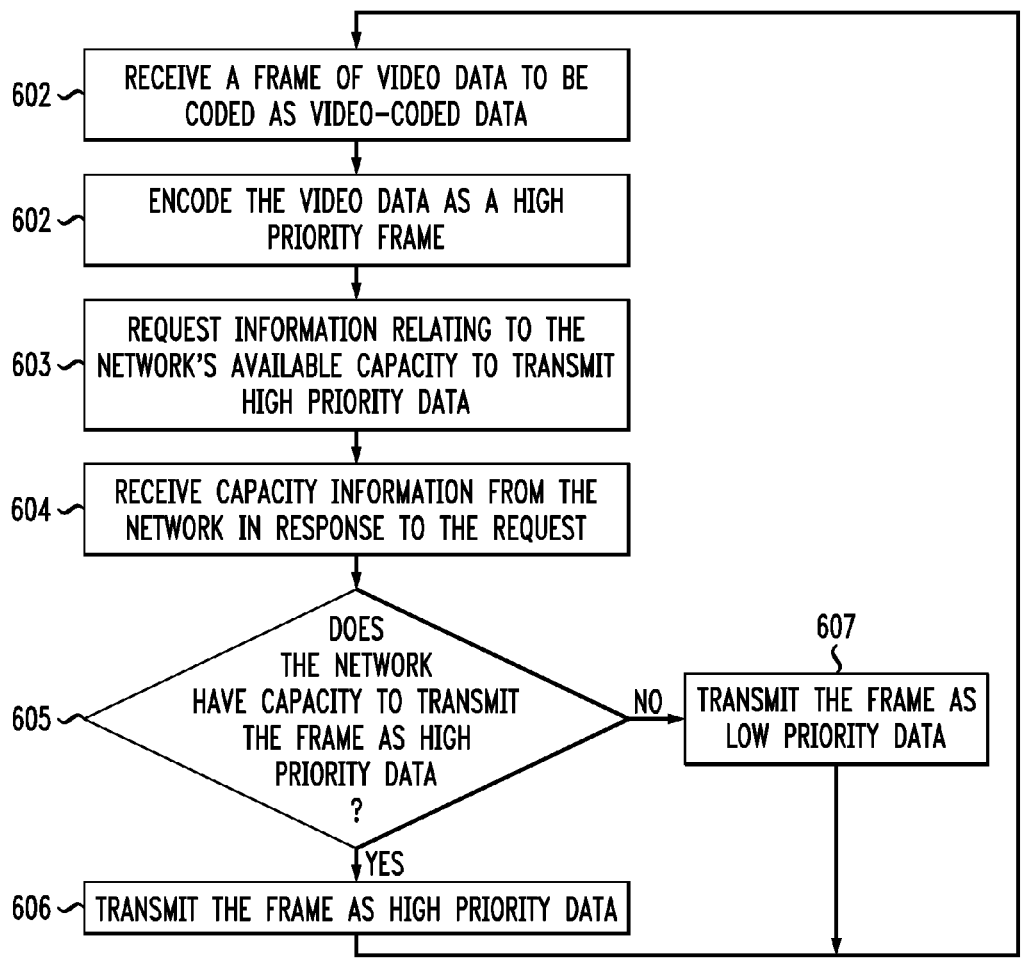

FIG. 6 is a flow diagram of a method of transmitting video information according to another embodiment of the present invention. As discussed above, a frame of video data to be coded as video-coded data may be received (601). In this embodiment, the frame is then encoded as a high priority frame (602). In this embodiment, all frames may be encoded as high priority frames prior to requesting and/or receiving any information about available network capacity. As shown in FIG. 5, after encoding the high priority frame, a request for information relating to the network's available capacity to transmitting high priority data is sent (603), and capacity information is received in response to the request (604). If the network has the capacity to transmit the frame as high priority data (605), then the request is transmitted as high priority data (606). If the network does not have the capacity to transmit high priority data (605), then the video frame is transmitted as low priority data (607).

Figure 7:
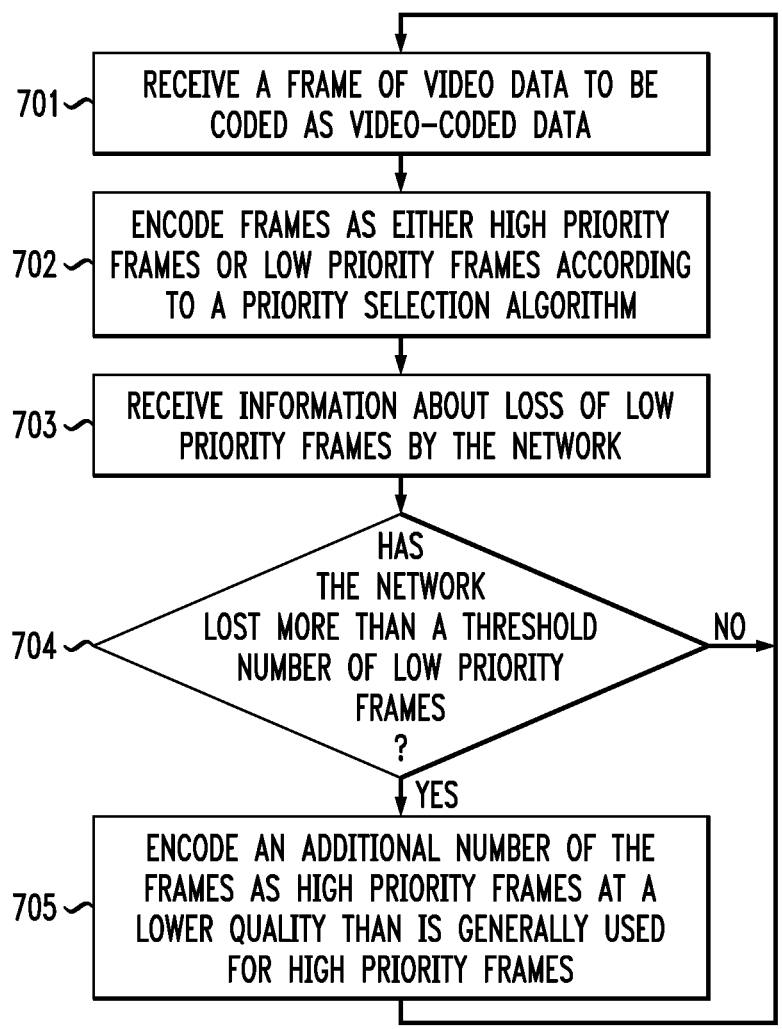

FIG. 7 is a flow diagram of a method of transmitting video information according to another embodiment of the present invention. A frame of video data to be coded as video-coded data may be received (701). In this embodiment, frames are encoded as either high priority frames or low priority frames based on a priority selection algorithm (702). The algorithm may use information about how much bandwidth is allocated for the transmission of high priority frames. The encoder then obtains information relating to the network's available capacity to transmit high priority data (703). This information may be obtained by network feedback or other means such as the Real Time Control Protocol (RTCP) from the Internet Engineering Task Force (IETF). If more than a threshold number of low priority frames have been lost (704), then an additional number of the frames may be encoded as high priority frames than is dictated by the transmission priority algorithm discussed above. These additional high priority frames may be encoded at a lower quality than is generally used for high priority frames.

The present invention improves the transmission of video information by using network feedback on available bandwidth. Through the use of feedback the present invention allows for the randomization of the arrival of high priority data into the network and, therefore, minimizes the likelihood of network overload. The present invention may also avoid the buffering of large amounts of data and the ensuing delay that such buffering may cause. Several embodiments of the present invention are specifically illustrated and/or described herein. However, it will be appreciated that modifications and variations of the present invention are covered by the above teachings and within the purview of the appended claims without departing from the spirit and intended scope of the invention. For example, unless otherwise specified, the order of the steps performed may be varied.

We claim:

1. A method comprising:
    transmitting a plurality of encoding frames in a network, each of the plurality of encoding frames having a first priority level, to yield transmitted encoded data;
    after transmitting the plurality of encoding frames, receiving at an encoder feedback from the network associated with the transmitted encoded data;
    analyzing the feedback to determine a network capacity for transmitting additional encoded data;
    when the network capacity is below a threshold, encoding the additional encoded data as base layer encoded data at a lower priority than the first priority level;
    when the network capacity is not below the threshold, encoding the additional encoded data as base layer encoded data at the first priority level and a lower quality than the transmitted encoded data; and
    transmitting the additional encoded data, wherein transmission of high priority encoded data into the network is randomized.

2. The method of claim 1, wherein the feedback relates to a threshold amount of frames associated with the first priority level not successfully being transmitted.

3. The method of claim 1, wherein the feedback comprises a response to a request for information on whether the network currently has available capacity to transmit additional data.

4. The method of claim 3, wherein the information on whether the network has available capacity to transmit additional data further comprises additional data related to high priority frames.

5. The method of claim 1, wherein transmitting the additional encoded data further comprises:
    transmitting the additional encoded data as at least one high priority video-coded frame if permission was granted to send high priority data.

6. The method of claim 5, wherein transmitting the additional encoded data further comprises transmitting the additional encoded data as low priority frames if permission was not granted to send high priority data.

7. The method of claim 6, wherein transmitting the additional encoded data further comprises deleting a video-coded frame from transmission if permission was not granted to send high priority data.

8. The method of claim 1, wherein transmitting the additional encoded data further comprises:
    requesting permission to transmit high priority data;
    encoding and buffering a high priority video frame at substantially a same time as requesting permission to transmit high priority data;
    transmitting the encoded video frame over the network as high priority data if permission to send high priority data was granted; and
    deleting the encoded video frame from transmission if permission to send high priority data was not granted.

9. The method of claim 1, wherein transmitting the additional encoded data further comprises:
    encoding as high priority frames all video frames that are to be transmitted, to yield at least one coded frame;
    for each of the at least one coded frame:
        requesting permission to send high priority data;
        transmitting the frame as a high priority frame if permission to transmit high priority data was granted; and
        transmitting the frame as a low priority frame if permission to transmit high priority data was not granted.

10. The method of claim 9, wherein the high priority frames are transmitted over the network separately than the low priority frames, wherein the high priority frames are transmitted over the network using a guaranteed quality of service trunk, and wherein the low priority frames are transmitted over the network on a best-effort trunk.

11. A method comprising:
    receiving video data to be coded into a video-coded frame;
    requesting information relating to a current available capacity of a network for sending high priority data based on transmission data on the network to yield a request;
    receiving capacity information in response to the request; and
    encoding the video data as a video-coded base layer frame if the capacity information indicates that the network has capacity available to send high priority data, wherein the video-coded base layer frame has a lower priority when the capacity below a threshold, while the video-coded base layer frame has a priority level equal to previously transmitted data and a lower quality than the previously transmitted data when the network capacity is above the threshold, wherein receipt of base layer frames in the network is randomized.

12. The method of claim 11, further comprising encoding the video data as a video-coded enhancement layer frame if the capacity information indicates that the network does not have capacity available to send high priority data.

13. The method of claim 12, further comprising transmitting base layer frames over the network separately than the enhancement layer frames, wherein the base layer frames are transmitted over the network using a guaranteed quality of service trunk, and wherein the enhancement layer frames are transmitted over the network on a best-effort trunk.

14. The method of claim 11, further comprising deleting the encoded video data without encoding the video data if the capacity information indicates that the network does not have capacity available to send high priority data.

15. The method of claim 11, wherein the video data is encoded as a base layer frame and buffered at substantially a same time as requesting the information relating to the network's available capacity, and wherein a buffered frame is deleted if the capacity information indicates that the network does not have capacity available to send high priority data.

16. The method of claim 11, wherein the video data is coded as a base layer frame prior to receiving information relating to the available capacity of the network, and wherein a buffered frame is transmitted as an enhancement layer frame if the information indicates that the network does not have capacity available to send high priority data.

17. A method comprising:
requesting capacity information from a network;
analyzing the capacity information to determine a network capacity for transmitting additional encoded data;
when the network capacity is below a threshold, encoding the additional encoded data as base layer encoded data at a lower priority than a first priority level at which previously transmitted encoded data was transmitted;
when the network capacity is not below the threshold, encoding the additional encoded data as base layer encoded data at the first priority level and a lower quality than the first priority level; and
transmitting the additional encoded data, wherein transmission of high priority encoded data into the network is randomized.

18. The method of claim 17, further comprising:
receiving a response from the network that provides permission to send high priority data; and
transmitting the base layer encoded data over the network.

19. The method of claim 17, further comprising:
receiving a response from the network that denies permission to send the high priority data; and
deleting the additional encoded data.

* * * * *